(12) United States Patent
Tapler et al.

(10) Patent No.: US 9,697,668 B2
(45) Date of Patent: Jul. 4, 2017

(54) AUTOMATICALLY CONFIGURABLE SMART CARD AND METHOD OF AUTOMATICALLY CONFIGURING A SMART CARD

(75) Inventors: Christoph Tapler, Graz (AT); Ernst Haselsteiner, Graz (AT)

(73) Assignee: NXP B.V., Eindhoven (NL)

( * ) Notice: Subject to any disclaimer, the term of this patent is extended or adjusted under 35 U.S.C. 154(b) by 1663 days.

(21) Appl. No.: 12/282,498

(22) PCT Filed: Feb. 14, 2007

(86) PCT No.: PCT/IB2007/050489
§ 371 (c)(1),
(2), (4) Date: Sep. 10, 2008

(87) PCT Pub. No.: WO2007/105120
PCT Pub. Date: Sep. 20, 2007

(65) Prior Publication Data
US 2009/0026275 A1 Jan. 29, 2009

(30) Foreign Application Priority Data
Mar. 14, 2006 (EP) .................. 06111084

(51) Int. Cl.
G06K 19/06 (2006.01)
G07F 7/10 (2006.01)
G06Q 20/34 (2012.01)

(52) U.S. Cl.
CPC .......... G07F 7/1008 (2013.01); G06Q 20/341 (2013.01); G06Q 20/355 (2013.01)

(58) Field of Classification Search
USPC ........................................ 235/492
See application file for complete search history.

(56) References Cited

U.S. PATENT DOCUMENTS

| 4,874,935 | A | 10/1989 | Younger |
| 5,787,172 | A * | 7/1998 | Arnold ................. 713/175 |
| 5,960,082 | A | 9/1999 | Haenel |
| 6,199,762 | B1 | 3/2001 | Hohle |
| 6,390,374 | B1 | 5/2002 | Carper et al. |
| 6,761,319 | B2 | 7/2004 | Peachman et al. |
| 7,025,261 | B2 | 4/2006 | Lagosanto et al. |
| 2002/0047049 | A1 | 4/2002 | Perron et al. |
| 2004/0245331 | A1 | 12/2004 | Vandewalle et al. |
| 2008/0005567 | A1* | 1/2008 | Johnson ........ G06Q 20/3552 713/172 |

FOREIGN PATENT DOCUMENTS

| CN | 1308750 A | 8/2001 | |
| CN | 1514987 A | 7/2004 | |
| EP | 0957461 A1 | 11/1999 | |
| EP | 1376492 A | 1/2004 | |
| EP | 1376492 A1 * | 1/2004 | ........... G07F 7/10 |
| WO | 2007042533 A | 4/2007 | |

OTHER PUBLICATIONS

Bonnet S et al; "A Model-Driven Approach for Smart Card Configuration". Jan. 2004, Lecture Notes in Computer Science, Springer Verlag, Berlin, DE. pp. 416-435.

* cited by examiner

Primary Examiner — Rafferty Kelly

(57) ABSTRACT

An automatically configurable smart card comprises—a generic data structure provided for containing smart card specific data, and—a smart card operating system being adapted to automatically detect the generic data structure and to migrate the generic data structure.

13 Claims, 2 Drawing Sheets

AUTOMATICALLY CONFIGURABLE SMART CARD AND METHOD OF AUTOMATICALLY CONFIGURING A SMART CARD

FIELD OF THE INVENTION

The invention relates to an automatic configuration of a smart card, particularly to an automatic migration of data by a smart card operating system.

BACKGROUND OF THE INVENTION

For assigning a smart card to a specific user, the smart card must be configured. Configuring a smart card means personalizing it with card specific data, for example cryptographic keys, certain IDs, or serial numbers. Thus, a configured smart card may be assigned to a certain user in accordance with the card specific data.

Card specific data may be stored in a non-volatile memory of the smart card. A non-volatile memory is typically implemented in form of EEPROM (Electrically Erasable Programmable Read Only Memory) or Flash technology. This type of memory is capable of storing up to several hundred Kbytes of data. In order to be able to manage such an amount of data, a file system-like architecture, for example a file structure as defined by ISO-7816, part 4, is needed. This file system is typically provided by an operating system (OS) of the smart card.

The file system of a non-volatile memory as such is initialized after the OS has been installed. Moreover, each OS has its proprietary file system. These limitations make it difficult to write card specific data in a non-volatile memory during the manufacturing process or during a pre-use configuring process. In order to overcome this drawback, installation of an OS and card specific data is performed in a complicated process. Two different approaches are known.

One approach is the so-called single-process approach. According to this approach, the OS and the card specific data are installed in one go. Usually, this process cannot be split up, because the OS and the card specific data may rely on each other. For example, the OS cannot be installed because cryptographic keys of the card specific data are needed, and the cryptographic keys cannot be installed because the OS is needed to provide the file system. The problem with this approach is the fact that different images including some OS data for every different smart card are required. An image means data stored in an EEPROM and in a ROM (Read Only Memory). Thus, even if finally configured smart cards differ only in one unique cryptographic key pair, different and entire images are needed to initialize the cards.

Another approach is the import of data structures after the OS was initialized. However, this approach has the problem that every smart card has to be handled twice. First, the OS must be initialized, and then the data must be initialized. For example, U.S. Pat. No. 4,874,935 discloses a way to make a smart card more flexible by storing an address table in the EEPROM of the smart card at the time of configuration or personalization, respectively. During operation of the smart card, the OS calls program instructions in accordance with the addresses indicated in the address table. Thus, it is possible to alter the programs stored in the ROM of the smart card.

OBJECT AND SUMMARY OF THE INVENTION

It is an object of the invention to provide an automatically configurable smart card and a method of automatically configuring a smart card, particularly for automatically migrating data by a smart card operating system.

In order to achieve the object defined above, an automatically configurable smart card according to the invention comprises characteristic features, so that an automatically configurable smart card according to the invention may be characterized as comprising:

a generic data structure provided for containing smart card specific data, and a smart card operating system being adapted to automatically detect the generic data structure and to migrate the generic data structure.

In order to achieve the object defined above, a method of automatically configuring a smart card according to the invention comprises characteristic features, so that a method of automatically configuring a smart card according to the invention can be characterized as comprising:

a generic data structure containing smart card specific data, and a smart card operating system that automatically detects the generic data structure and migrates the generic data structure.

The characteristic features according to the invention provide the advantage that the configuration of a smart card is less complex and easier than with the known methods and devices, since it allows to split up the process of initialization of a smart card operating system and initialization of card specific, for example sensitive data. The invention makes it also possible to install sensitive data before providing the smart card operating system. Thus, the smart card operating system can rely on certain configurations, e.g. cryptographic keys, and does not have to be configured afterwards. Finally, the generic data structure may not be adapted to each change of the smart card operating system. The smart card operating system only has to provide means for migrating the generic data structure into the smart card operating system, for example means for transforming the generic data structure into a format which is used by the smart card operating system.

The smart card operating system may be adapted to automatically detect the generic data structure and to migrate the generic data structure when the smart card operating system is booted for the first time. Thus, the first time the smart card operating system is booted, the process of migration is performed in order to configure the smart card for usage.

In a preferred embodiment of the invention, the smart card operating system may be adapted to check for a magic number at a predefined location in a non-volatile memory of the smart card at boot time for detecting the generic data structure.

The smart card operating system may further be adapted to check the validity of the detected generic data structure by using a hash or cyclic redundancy check algorithm. This increases the security, since manipulations of the generic data structure may be detected.

According to a further embodiment of the invention, the smart card operating system may be adapted to read the type and size of data contained in the generic data structure and to create one or more objects adapted for storing data according to the read type and size of data and comprising a smart card operating system-based structure.

Furthermore, the smart card operating system may be adapted to copy data contained in the generic data structure into the created object(s) for migrating the generic data structure.

In order to further increase security and save memory, the smart card operating system may be adapted to remove the generic data structure after migration of the generic data structure. Thus, it is not possible to read out the generic data structure after migration. Furthermore, the memory required for storing the generic data structure is released for storing other data.

According to a further aspect, the invention relates to a generic data structure being adapted for a smart card according to the invention and comprising a magic number for identifying the generic data structure, a number of data structures, the size of the payload data contained in the generic data structure, and payload data.

The generic data structure may further comprise an identifier of the payload data adapted to be interpretable by the smart card operating system.

Furthermore, the generic data structure may comprise integrity check data for checking the integrity of the payload data and other metadata.

According to a further aspect, the invention relates to a method of manufacturing a smart card according to the invention, comprising the steps of packing payload data and metadata for the generic data structure, writing the generic data structure to a non-volatile memory of the smart card, and checking the integrity of the generic data structure stored in the non-volatile memory.

Finally, the method of configuring a smart card according to the invention may further comprise the steps of checking at the first boot time whether a generic data structure is available, checking the integrity of an available generic data structure, and migrating an available generic data structure checked for integrity into a file system of the smart card operating system.

The aspects defined above and further aspects of the invention will be apparent from the exemplary embodiments to be described hereinafter and are explained with reference to these exemplary embodiments.

BRIEF DESCRIPTION OF THE DRAWINGS

The invention will be described in more detail hereinafter with reference to an exemplary embodiment. Needless to say, that the invention is not limited to this exemplary embodiment.

DESCRIPTION OF EMBODIMENTS

A host computer is used for preparing an automatically configurable smart card according to the invention. After preparation, the smart card automatically configures itself according to the preparation by the host computer by performing a migration process of a generic data structure into the operating system (OS) of the smart card. The effort by the host computer consists in providing the raw data and wrapping them into the generic data structure.

The host computer may be a standard Personal Computer (PC) equipped with a smart reader and writer and dedicated smart card preparation software for preparing automatically configurable smart cards according to the invention. The software is adapted to receive input data containing any card specific data such as a personal user ID, a customer ID, name and address of a user, a cryptographic key of a user or any other data which is unique for a specific user. The input data may be received by manually entering it via a keyboard of the PC, by reading it from a data carrier such as a CD-ROM, DVD, floppy disk or memory stick, or via a computer network such as the Internet or an Intranet.

After receipt of the input data, the software analyzes the type and size of the received input data and determines the number of objects required for storing the input data in a file system of a smart card operating system. Then, the software wraps the received input data into the generic data structure in accordance with the results of the analysis, i.e., distributes different types of the input data into different objects and provides each of the objects with a header containing a type identifier and a size identifier.

Figure 2:
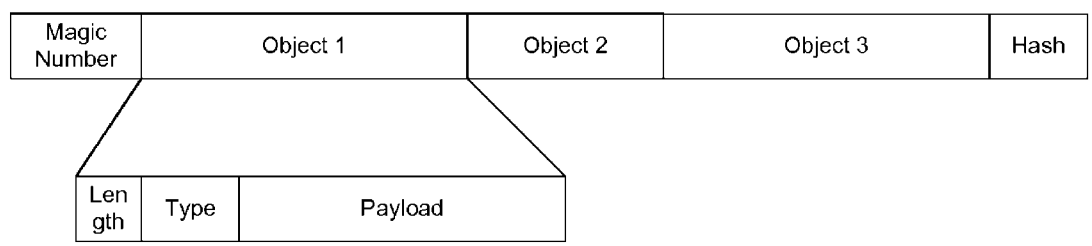
FIG. 2 shows an embodiment of a generic data structure according to the invention.

Thereafter, the software creates the generic data structure by generating a magic number required for identifying the generic data structure by the smart card operating system and a hash or CRC required for integrity checks of the generic data structure. Finally, the software joins the data blocks to form the generic data structure, such as shown in FIG. 2, with the magic number at the beginning, the objects in the middle, and the hash or CRC at the end.

Figure 1:
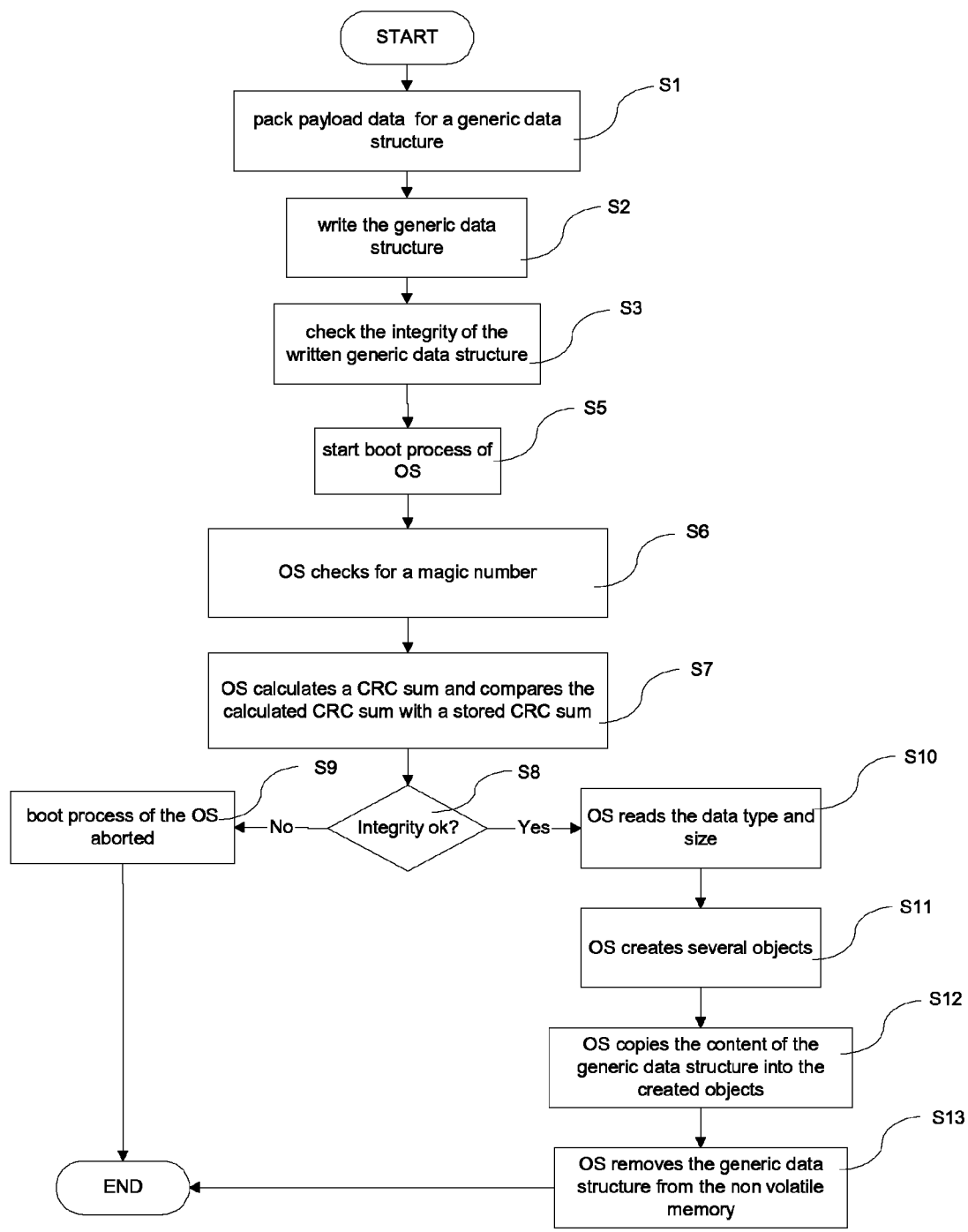
FIG. 1 shows a flow chart of an embodiment of a method of automatically configuring a smart card according to the invention.

After completion of the generic data structure with the software, a smart card may be prepared for an automatic configuration, as will be explained in the following in more detail. The entire procedure including the preparation by the host computer and the configuration by the smart card is split into several stages, as shown in the flowchart of FIG. 1.

In a first step S1, payload data for the generic data structure comprising the card specific data and metadata for the generic data structure are packed in the host computer as described above. The payload data can contain non-static (changing) content, for example data which may later be altered or updated. Thus, the application of the automatically configurable smart card according to the invention may be more flexible.

In a second step S2, the host computer writes the generic data structure to the non-volatile memory of the smart card, for example an EEPROM or a Flash memory. The process of writing may be initiated either manually or automatically. In a production environment, it may be preferred to automatically initiate the writing process immediately after finishing the creation of a generic data structure. The generic data structure is written to a specific location in the memory. This location is predefined and coded in an operating system adapted for automatically migrating the generic data structure. It should be noted that the payload data packed in the generic data structure are transferred from the host computer to the smart card without using (not yet existent) card operating system services.

In a third step S3, the integrity of the generic data structure written to the memory of the smart card is checked in order to detect any errors which may occur during the process of transferring and writing the data. Simply said, it is checked whether the data has been transferred correctly to the predefined memory location. The integrity check may be performed by reading the generic data structure from the smart card memory, to calculate a hash or CRC from the read data, and to compare the calculated hash or CRC with the hash or CRC calculated by the software. If the comparison result is OK, i.e. if both hashes and CRCs do not differ, the process may continue with the following step. Otherwise, the process of preparing the smart card may be aborted.

Thereafter, the smart card is prepared for an automatic configuration and may be distributed by a smart card issuer to users. Thus, by performing steps S1 to S3, an automatically configurable smart card may be obtained.

It should be noted that at this stage the smart card already contains card specific data such as the private cryptographic key of a certain user as well as further card specific data such as an ID or the name and birthday of a user. However, it should also be noted that it is not required that the generic data contain card specific data at this stage. It is also possible that the generic data contain for example random data which may be altered after this stage, for example updated in accordance with user data. This process may be performed in the software on the host computer. In such a case, the software may first update the payload data and then pack the updated payload data again in a generic data structure. The updated generic data structure can then be written again to the memory of the smart card in order to update the entire smart card.

The process of an automatic configuration of the smart card is described in the following, with reference to FIG. 1 and steps S5 to S13.

In a step S5, the boot process of the operating system is started. This may for example be done by the first power-up of the smart card. The boot process contains the initialization of the operating system, which is performed in steps S6 to S13 and comprises the migration of the generic data structure in the operating system. In other words, the initialization of the operating system means an automatic configuration of the operating system in accordance with card specific data contained in the generic data structure.

In a step S6, immediately after starting the boot process, the operating system checks for a magic number of the generic data structure at the predefined location in the non-volatile memory where the generic data structure was written in step S2. The predefined certain location may be the first memory address of an area in the non-volatile memory which is reserved for a generic data structure. The magic number provides the operating system with the information that a generic data structure is available. It may be, for example, a bit sequence indicating the availability of a generic data structure.

In a following step S7, the operating system performs a CRC algorithm from the detected generic data structure and compares the determined CRC sum with the CRC sum stored in the memory as part of the generic data structure. Thus, the integrity of the generic data structure may be checked. The integrity check is not a required step in this process, but may be important for security reasons since it helps to detect generic data structure manipulations performed after the generic structure was written in the memory.

If the integrity of the generic data structure is determined as not being OK (step S8), the boot process and the configuration of the operating system is aborted (step S9). In such a case, the generic data structure may have been manipulated after it was written in the memory or even after the operating system was installed.

Otherwise, i.e. if the integrity of the generic data structure is checked as being OK, the operating system reads the data type and size from the generic data structure (step S10). It should be noted that only that data is read which is needed for creating an object. This is typically the data type and size. Thus, it can be avoided to read out the entire generic data structure from the memory, which may take some time depending on the amount of data.

In a step S11, the operating system creates several objects according to the read data's type and size. The created objects provide the memory for the payload data contained in the generic data structure. Typically, the created objects conform to a file system structure of the operating system, so that the operating system can access the card specific data.

In a step S12, the operating system copies the content of the generic data structure into the created objects, i.e., it extracts the payload data from the generic data structure and copies the extracted data into the objects.

Finally, in a step S13, the operating system removes the generic data structure from the non-volatile memory in order to release the memory for the storage of other data.

It should be noted that the process of automatic configuration of the smart card as described with reference to steps S5 to S13 may be performed incrementally, especially when a large amount of data has to be migrated. "Incrementally" as used herein means that, for example, only the first three objects are migrated during the first booting of the smart card, the next three objects during the second booting, and so on.

The definition of a generic data structure is a trade off between as simple as possible and as generic as possible. The migration process should not require complex software, because this software has to be located in the smart card hardware and complex software usually requires a lot of memory.

An embodiment of a generic data structure according to the invention is shown in FIG. 2. The data structure comprises as header a magic number for identifying the generic data structure, three objects: object 1, object 2 and object 3, and a hash of the generic data structure for checking the integrity. Each of the objects comprises a field containing the length of the payload data stored in this object (size of the payload data), a field containing the type of the payload data (identifier of the payload data), and the payload data itself.

The operating system has to be aware of the type of payload data. This is realized by conveying an ID in the length field of each object, which is interpretable by the operating system.

The payload data may comprise user or smart card specific data, for example a private key or smart card related parameters.

The hash or a checksum provides the operating system with the information that this is actual data and not any random content in the EEPROM where the generic data structure may be stored. Moreover, this provides the ability to check the integrity of the payload and other metadata.

The invention claimed is:

1. An automatically configurable smart card comprising:
a generic data structure comprising user specific data located in an area of non-volatile memory reserved for generic data structures, and
a smart card operating system located outside of the area of non-volatile memory reserved for generic data structures, wherein;
once the smart card operating system initializes, the smart card further comprises a file system structure, the file system structure storing several objects according to the type and size of the user specific data located in the generic data structure;
the smart card operating system is adapted to read the type and size of the user specific data located in the generic data structure and to create one or more objects adapted for storing the user specific data according to the read type and size of the user specific data and comprising a smart card operating system-based structure; and the smart card operating system is adapted to automatically detect the generic data structure and to migrate the user specific data from the generic data structure into the several objects stored in the file system, wherein the generic data structure comprising the user specific data is a pre-installed generic data structure configured to be installed onto the smart card prior to an initialization of the operating system and without using smart card operating system services.

2. The smart card of claim 1, wherein the smart card operating system is adapted to automatically detect the generic data structure and to migrate the generic data structure when the smart card operating system is booted for the first time.

3. The smart card of claim 1, wherein the smart card operating system is adapted to check for a magic number at a predefined location in a non-volatile memory of the smart card at boot time for detecting the generic data structure.

4. The smart card of claim 3, wherein the smart card operating system is adapted to check the validity of the detected generic data structure by using a hash or cyclic redundancy check algorithm.

5. The smart card of claim 1, wherein the smart card operating system is adapted to copy data contained in the generic data structure into the created object(s) for migrating the generic data structure.

6. The smart card of claim 5, wherein the smart card operating system is adapted to remove the generic data structure after migration of the generic data structure.

7. The generic data structure of claim 1, wherein the generic data structure is adapted for a smart card and comprising:
a magic number for identifying the generic data structure, a number of data structures,
the size of the payload data contained in the generic data structure, and payload data.

8. The generic data structure of claim 7, further comprising an identifier of the payload data adapted to be interpretable by the smart card operating system.

9. The generic data structure of claim 7, further comprising integrity check data for checking the integrity of the payload data and other metadata.

10. The smart card of claim 1, wherein migrating the generic data
structure further comprises migrating the generic data structure into the operating system by transforming the generic data structure into a format usable by the operating system, wherein migrating the generic data structure configures the smart card for usage.

11. A method comprising:
automatically configuring a smart card upon initialization of the smart card by a user, wherein automatically configuring the smart card further comprises:
initializing a smart card operating system, wherein upon initialization the operating system automatically detects a generic data structure stored at a predefined location of a non-volatile memory of the smart card, creates a file system structure storing several objects according to the type and size of user specific data located in the generic data structure and then and migrates the data of the generic data structure into the several objects stored in the file system structure, wherein the generic data structure is a pre-installed generic data structure comprising user specific data configured to be installed onto the smart card prior to an initialization of the operating system and without using smart card operating system services; and wherein the smart card operating system is adapted to read the type and size of the user specific data located in the generic data structure and to create one or more objects adapted for storing the user specific data according to the read type and size of the user specific data and comprising a smart card operating system-based structure.

12. The method of claim 11, wherein the smart card operating system checks at the first boot time whether a generic data structure is available, checks the integrity of an available generic data structure, and migrates an available generic data structure comprising user specific data checked for integrity into a file system of the smart card operating system.

13. A method of automatically configuring a smart card, the method comprising:
receiving input data comprising user specific data unique for the smart card;
creating an object for each type of the input data, wherein each object contains a type and a size of the corresponding input data;
joining multiple objects together to form a generic data structure containing the received input data;
storing the generic data structure to a predefined location of a non-volatile memory of the smart card that is reserved for generic data structures prior to initialization of an operating system on the smart card; and
preparing the operating system of the smart card for automatic configuration upon initialization of the operating system, wherein the automatic configuration of the operating system comprises checking for the generic data structure at the predetermined location of the non-volatile memory;
wherein, a smart card operating system automatically detects the generic data structure comprising the user specific data and migrates the data of the generic data structure into objects stored in a file system structure created by the operating system according to the type and size of user specific data located in the generic data structure, wherein the generic data structure is a pre-installed generic data structure configured to be installed onto the smart card prior to an initialization of the operating system and without using smart card operating system services; and
wherein the smart card operating system is adapted to read the type and size of the user specific data located in the generic data structure and to create one or more objects adapted for storing the user specific data according to the read type and size of the user specific data and comprising a smart card operating system-based structure.

* * * * *